May 17, 1927.

F. E. GARBUTT 1,629,029

FILM TAKE-UP DEVICE WITH BRAKE

Filed July 25, 1925

INVENTOR:
FRANK E. GARBUTT,
BY
ATTORNEY.

May 17, 1927. 1,629,029
F. E. GARBUTT
FILM TAKE-UP DEVICE WITH BRAKE
Filed July 25, 1925 2 Sheets-Sheet 2
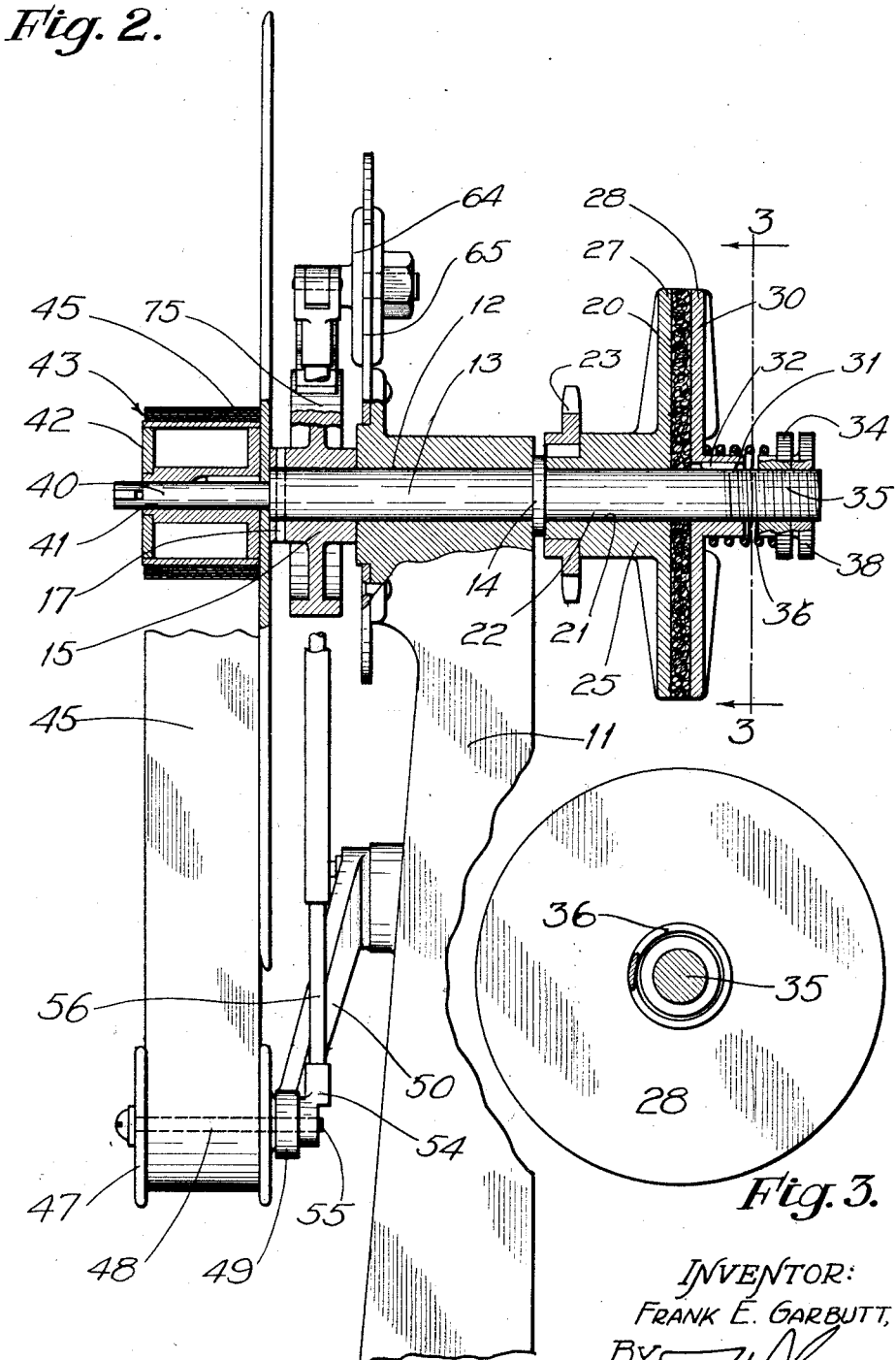
INVENTOR:
FRANK E. GARBUTT,
BY
ATTORNEY.

Patented May 17, 1927.

1,629,029

UNITED STATES PATENT OFFICE.

FRANK E. GARBUTT, OF LOS ANGELES, CALIFORNIA, ASSIGNOR TO FAMOUS PLAYERS-LASKY CORPORATION, OF NEW YORK, N. Y., A CORPORATION OF NEW YORK.

FILM-TAKE-UP DEVICE WITH BRAKE.

Application filed July 25, 1925. Serial No. 46,155.

My invention relates to a film winding device. In the film developing industry an exposed film is passed through a number of machines in order to prepare it for market. It is common practice to wind the film on a reel as it passes from each machine so that it may be conveniently transferred to the next machine.

The film must be wound on such a reel at a substantially uniform speed. The film is wound in layers on itself on the reel and as the diameter on which the film is wound is increased the speed of winding is also increased, unless the rotation of the reel is reduced.

It is an object of my invention to provide a film winding device having a reel which is automatically slowed in rotation so that the winding of the film will be substantially uniform.

The film does not always travel at a uniform rate of speed through these machines, and the speed at which the film is wound on the winding reel is determined by the speed at which it passes through the machine. If the receiver reel is rotated too slowly for the film, the film will tangle and may be thus destroyed; and if the winding reel is rotated too fast for the film the normal tension thereof will be exceeded, which results in detrimental strains on the films and sometimes in a breakage thereof.

It is an object of my invention to provide a film winding device for automatically winding film at a rate of speed which will maintain the film at a normal tension.

It is an object of my invention to provide a film winding device of this character in which the speed of winding the film is controlled by the tension of the film.

It is another object of my invention to provide a film winding device of the character mentioned in which the speed of the winding reel of the device is retarded by a brake mechanism.

It is a further object of my invention to provide a film winding device of this character which has a winding reel which is frictionally driven by a clutch so that a brake mechanism may be utilized for limiting the speed of the reel.

Other objects and advantages of my invention will be made evident hereinafter.

Referring to the two sheets of drawings in which I illustrate a preferred form of my invention:

Fig. 2 is an elevational view, partly sectioned, of my invention, this view being taken substantially as indicated by an arrow 2 of Fig. 1.

Fig. 3 is a fragmentary section taken on a line 3—3 of Fig. 2.

Figure 1:
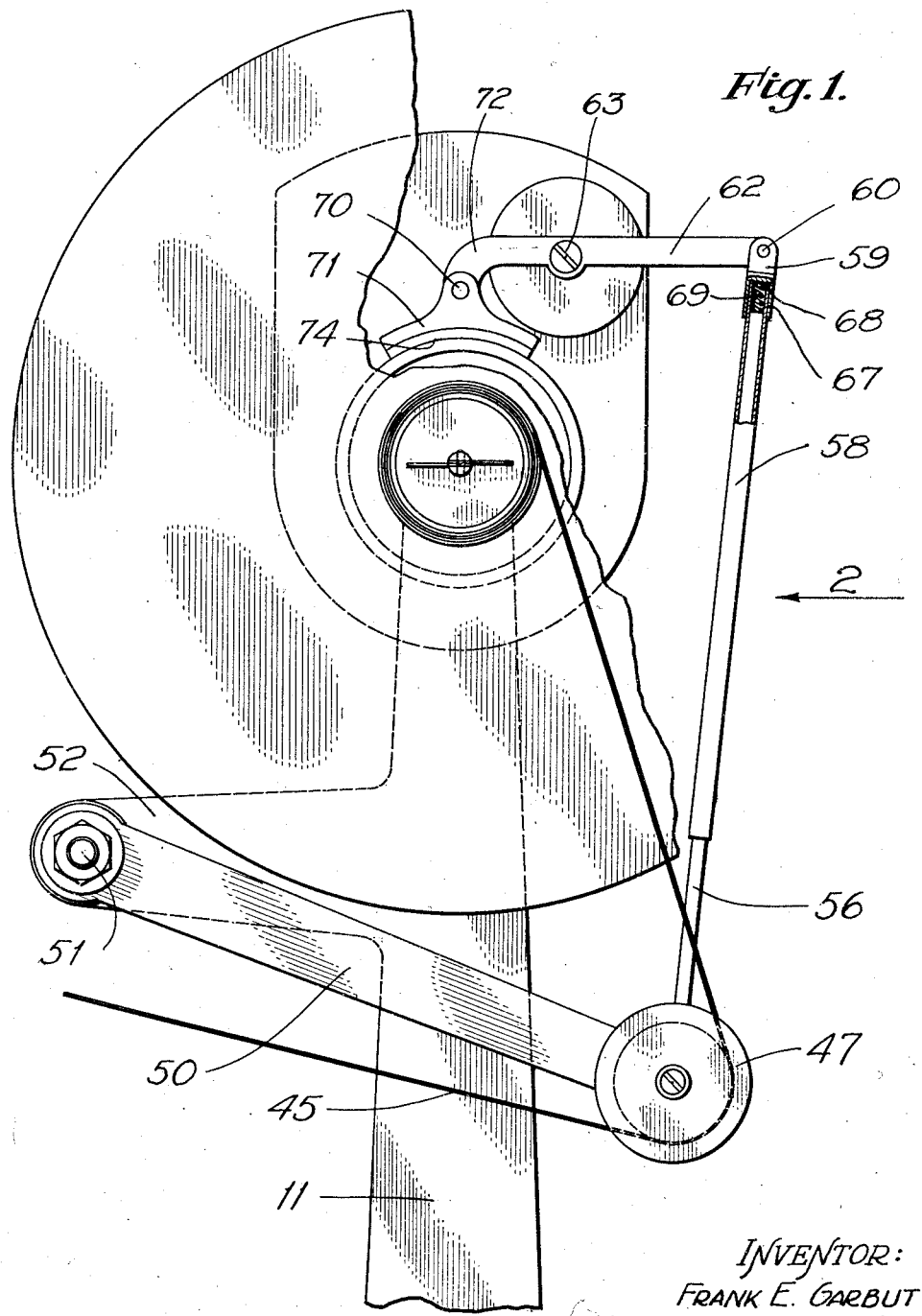
Fig. 1 is an elevational view of my invention.

With reference to the drawings, my invention provides a bracket 11 having a bearing 12 through which a reel shaft 13 is extended. A flange 14 is formed on the shaft 13 adjacent to the right end of the bearing 12 and a hub 15 is rigidly secured by a pin 17 on the shaft 13 at the left end of the bearing 12. The flange 14 and the hub 15 restrict the shaft 13 from axial movement.

A drive clutch element 20 having a bearing 21 through which a journal portion 22 of the shaft 13 extends is rotatably driven by a sprocket wheel 23 which is secured to a hub portion 25 thereof. A plate 27 of the drive clutch element 20 is frictionally engaged by a plate 28 of a driven clutch element 30. The driven clutch member 30 has a cylindrical projection 31, through which the portion 22 of the shaft 13 extends, the driven element 30 being drivably secured to the portion 22 of the shaft 13 by a key 32. The key 32 prevents relative rotational movement, but allows relative axial movement between the shaft 13 and the driven element 30. A tension adjustment nut 34 is threadably placed on a threaded end 35 of the portion 22 and a compression spring 36 is compressed between this nut 34 and the plate 28 of the driven clutch element 30, a portion of the spring 36 surrounding the hub 31. The tension adjustment nut 34 is locked in place by a lock nut 38. The driven clutch element 30 is retained in frictional engagement by means of the compression spring 36 and the shaft 13 is frictionally driven through the clutch elements 20 and 30.

A reel supporting portion 40, which is formed at the left end of the shaft 13, extends through an opening 41 of a hub 42 of a winding reel 43 on which a film 45 is wound, as shown in the drawings.

The film 45 in passing to the winding reel 43 extends over a tension compensating pulley 47 which rotates on a shaft 48, this shaft 48 being supported by a free end 49 of a tension compensating arm 50. The arm 50 is pivotally secured on a bolt 51 supported in an extension 52 of the bracket 11. The weight of the arm and the pulley is supported by the film 45 and as the tension in the film increases and decreases the free end of the arm and the pulley are accordingly raised and lowered. A pivot member 54 is pivotally secured to the free end 49 of the arm 50, preferably on an extended end 55 of the shaft 48. A slide rod 56 extends from the pivot member 54 into a guide tube 58 which forms a part of the guide member, which guide member includes a clevis bracket 59 which is pivotally secured, by a pivot pin 60, to one end of a lever 62. The lever 62 is fulcrumed on a fulcrum 63 which extends from a fixture 64, this fixture 64 being secured to a plate 65 supported by the bracket 11. An open coil spring 69 resting on the end face 67 of the slide rod 56 is adapted to engage the face 68 of the guide member when the arm 50 and the pulley 47 are raised, thus preventing any sudden or harsh application of the brake.

A pin 70 pivotally secures a brake shoe 71 to an end 72 of the lever 62, which is opposite from the end at which the guide member is pivoted. An arcuated engagement face 74 of the brake shoe 71 is adapted to engage a brake drum 75, which is rigidly secured to the shaft 13. In the drawings, the brake drum 75 is shown as being formed integral with the hub 15.

The operation of my invention is substantially as follows:

The film 45 is extended from a machine, through which it is being passed, around the pulley 47 to the hub of the winding reel 43 on which it is to be wound. The sprocket wheel 23 is rotated by a sprocket chain, not shown, which rotates the drive clutch element 20. The drive clutch element 20, being in frictional engagement with the driven clutch element 30, drives this driven clutch element 30. The driven clutch element is non-rotatably secured to the shaft 13 by the key 32 and therefore the shaft 13 is rotated therewith. The winding reel 43 rotates with the shaft 13 and winds the film 45 thereon.

When tension in the film exceeds its normal tension the pulley 47, being supported thereby, is elevated. The upper end of the spring 69, acting through the cushioning spring 59, elevates the right end of the lever 62, Fig. 1, and depresses the left end of the lever 62. This action applies the brake shoe 71 to the drum 75 which places a frictional resistance against the rotation of the shaft 13. The shaft 13 is slowed down at this time, there being a slippage between the drive and driven clutch element 20 and 30. The film is wound on the winding reel 43 at a slower rate of speed and consequently the tension of the film will reduce. When this occurs, the pulley 47 will lower and the engagement of the brake shoe 71 with the brake drum 75 is released.

In practice it is found desirable to adjust the machine so that there is a slight frictional engagement between the shoe 71 and the brake drum 75 when the film is at normal tension so that the shaft 13 will not be rotated at its maximum speed; then if the tension of the film drops below normal the brake action will be entirely released and the shaft 13 will run at its maximum speed until the winding reel takes up the film and returns it to normal tension.

As the film 45 is wound on the reel 42 the winding diameter thereof increases and if the shaft 13 is rotated at the same speed the film 45 will be wound at a higher rate of speed and the tension in the film will exceed normal. When this occurs, the brake shoe 71 will be applied to the drum 75, thus slowing down the rotation of the shaft 13 and the reel 42. As the winding diameter of the film on the reel 42 increases, the reel is gradually slowed up in rotational speed so that the speed of the winding of the film on the reel will remain substantially uniform, the friction of engagement between the shoe 71 and the brake drum 75 being increased as the winding diameter of the film increases.

The rod 56 operates the lever 62 only when it is above a certain position. When the tension compensating mechanism falls below a certain position the brake mechanism is not operated thereby and therefore the movement in the lever 62 and shoe 71 may be very small.

The friction of engagement between the drive and driven clutch elements 20 and 30 is adjustable by operating the tension adjustment nut 34, which places more or less pressure on the compression spring 36.

My invention is useful on any machine handling a film or other similar strip. There will be no danger of breaking or straining of the film due to an excess of tension therein. Neither will there be danger of the film or strip tangling due to a too slow winding thereof on the winding reel 43. The construction of my invention is very simple and is dependable in operation. The mechanism is operated, as previously disclosed, entirely by the tension in the film or strip being wound and permits the winding reel to rotate at such a speed as to maintain a tension in the film or strip at normal.

I claim as my invention:

1. In a film winding device, the combination of: a rotatably supported shaft; a winding reel on which a film may be wound, mounted on said shaft to rotate therewith; means for frictionally driving said shaft; a swingably supported pulley over which said film extends in a manner to support said pulley, said pulley being moved when the tension of said film changes; a rod pivotally associated with said pulley; a guide member into which said rod extends; a spring situated in said tube between an end of said rod and an end of said guide member; a lever to which said guide member is attached, said lever being swung when said rod exerts a force on said guide member through said spring; a brake drum rigidly secured to said shaft; and a brake shoe attached to said lever, said shoe being operated by said lever in a manner to engage said drum and to permit said winding reel to be rotated at such a speed that said film will be maintained at a uniform tension.

2. In a film winding device, the combination of: a rotatably supported shaft; a winding reel on which a film may be wound, mounted on said shaft to rotate therewith; means for frictionally driving said shaft; a swingably supported pulley over which said film extends in a manner to support said pulley, said pulley being moved when the tension of said film changes; a rod pivotally associated with said pulley; a guide member into which said rod extends, said guide member having an upper end which said rod may engage and a lever to which said guide member is attached, said lever being swung when said rod exerts a force on the end of said guide member; a brake drum rigidly secured to said shaft; and a brake shoe attached to said lever, said shoe being operated by said lever in a manner to engage said drum and to permit said winding reel to be rotated at such a speed that said film will be maintained at a uniform tension.

In testimony whereof, I have hereunto set my hand at Los Angeles, California, this 16th day of July, 1925.

FRANK E. GARBUTT.